(12) United States Patent  (10) Patent No.: US 7,210,838 B2
Sakurai  (45) Date of Patent: May 1, 2007

(54) ELECTRO-OPTICAL DEVICE AND ELECTRONIC APPARATUS

(75) Inventor: Shinji Sakurai, Nagano (JP)

(73) Assignee: Seiko Epson Corporation (JP)

( * ) Notice: Subject to any disclaimer, the term of this patent is extended or adjusted under 35 U.S.C. 154(b) by 201 days.

(21) Appl. No.: 11/113,410

(22) Filed: Apr. 22, 2005

(65) Prior Publication Data

US 2005/0259442 A1 Nov. 24, 2005

(30) Foreign Application Priority Data

May 24, 2004 (JP) ............................. 2004-153275

(51) Int. Cl.
G02F 1/1335 (2006.01)
F21V 8/00 (2006.01)
(52) U.S. Cl. .................... 362/607; 362/612; 362/618; 349/65
(58) Field of Classification Search ................ 362/618, 362/606, 607, 612, 616, 617, 627; 349/61, 349/62, 65
See application file for complete search history.

(56) References Cited

U.S. PATENT DOCUMENTS

| 6,074,070 | A * | 6/2000 | Sasako ................. 362/607 |
| 6,741,301 | B2 * | 5/2004 | Tsuji ..................... 349/58 |
| 6,882,382 | B2 * | 4/2005 | Son ....................... 349/65 |
| 6,897,912 | B2 | 5/2005 | Kawakami et al. ....... 349/61 |
| 7,001,059 | B2 * | 2/2006 | Han et al. ............... 362/616 |
| 7,111,974 | B2 * | 9/2006 | Mizutani et al. ......... 362/607 |
| 2003/0234897 | A1 * | 12/2003 | Ozawa ................... 349/65 |
| 2004/0042233 | A1 * | 3/2004 | Suzuki et al. ........... 362/561 |
| 2005/0185111 | A1 * | 8/2005 | Matsuoka ............... 349/58 |

FOREIGN PATENT DOCUMENTS

| JP | 2003-066418 | 3/2003 |
| JP | 2003-066480 | 3/2003 |
| KR | 2001-0107599 | 12/2001 |

* cited by examiner

*Primary Examiner*—Alan Cariaso
(74) *Attorney, Agent, or Firm*—Harness, Dickey & Pierce, P.L.C.

(57) ABSTRACT

An electro-optical device includes a backlight device that has a light emitting element and a light guide plate in which light emitted from the light emitting element is incident on a side end surface thereof and is emitted from a first surface and a second surface thereof, a first panel that is arranged opposite to the first surface of the light guide plate to modulate light when light from the first surface passes therethrough, and a second panel that is arranged opposite to the second surface of the light guide plate to modulate light when light from the second surface passes therethrough. In the electro-optical device, one or more optical sheets are arranged between the light guide plate and the second panel, an optical sheet of the optical sheets is laminated on the second surface of the light guide plate such that an end edge of the optical sheet is positioned between the side end surface of the light guide plate and an outer circumferential edge of an image display region of the first panel to form a space having a predetermined width between the end edge of the optical sheet and the side end surface of the light guide plate, and a light emitting element mounting substrate on which the light emitting element is mounted is configured such that a part adjacent to a region on which the light emitting element is mounted is laminated on the space of the light guide plate and a light emitting axis of the light emitting element faces the side end surface of the light guide plate.

10 Claims, 8 Drawing Sheets

ELECTRO-OPTICAL DEVICE AND ELECTRONIC APPARATUS

BACKGROUND OF THE INVENTION

1. Technical Field

The present invention relates to an electro-optical device which can display images on dual surfaces of an electro-optical panel and an electronic apparatus using the electro-optical device.

2. Related Art

Figure 8:
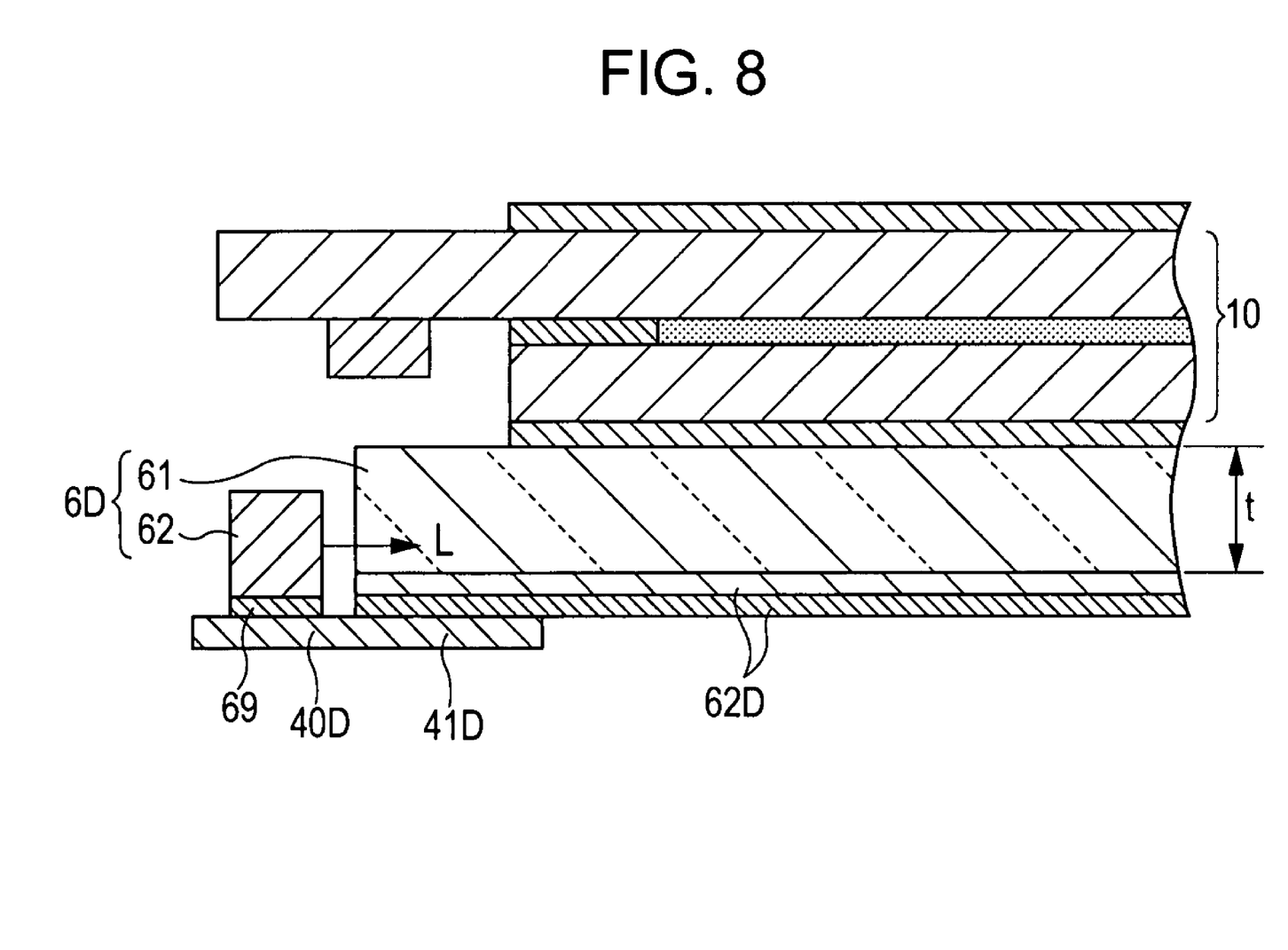
FIG. 8 is an expanded cross-sectional view showing a light-source-side end portion of an electro-optical device according to a related art.

Since a liquid crystal device as a representative example of an electro-optical device has a small thickness, a small weight, and low power consumption, liquid crystal devices have been widely used as display devices of electronic apparatuses such as mobile phones, mobile computers, or the like. A liquid crystal device, which displays images using transmitted light, has a transmissive or transflective liquid crystal panel 10 and a backlight device 6D, as shown in FIG. 8. In the backlight device 6D, light emitted from a light emitting diode (LED) 62 as a light source is emitted toward the liquid crystal panel 10 while passing through a light guide plate 61.

Further, in the backlight device 6D, an optical sheet 62D such as a prism sheet or a reflection sheet may be arranged at the rear surface of the light guide plate 61. The LED 62 constituting the light source in the backlight device 6D is typically mounted on a substrate 40D by a solder 69, and the substrate 40D is typically positioned such that a part adjacent to a region where the LED 62 is mounted is laminated on the optical sheet 62D at the rear surface of the light guide plate 61.

Recently, in foldable mobile phones and the like, a main liquid crystal display unit is provided at an inner surface of a cover body and a sub liquid crystal display unit is provided at an outer surface of a cover body, such that images can be displayed in the folded state and in the open state. Therefore, in the case of providing a foldable mobile phone with two display units using the above-mentioned liquid crystal devices, two liquid crystal panels 10 and two backlight devices 6D must be mounted in the mobile phone. As a result, it is difficult to reduce the thickness and weight of the mobile phone.

In addition, when the substrate 40D is positioned after laminating all optical sheets 62D, the LED 62 goes down by the total thickness of the optical sheets 62D. As a result, a light emitting axis L of the LED 62 is deviated downward from the center in the thicknesswise direction t of the light guide plate 61. Therefore, the light quantity distribution of light emitted from the light guide plate 61 or the like cannot be implemented as designed.

SUMMARY

An advantage of the invention is that it provides an electro-optical device which can perform dual surface display with a reduced number of parts and can properly arrange a light emitting axis from a light source and a light guide plate, and an electronic apparatus using the electro-optical device.

The above advantage of the invention is achieved by an electro-optical device according to an aspect of the invention, which includes: a backlight device that has a light emitting element and a light guide plate in which light emitted from the light emitting element is incident on a side end surface thereof and is emitted from a first surface and a second surface thereof, a first panel that is arranged opposite to the first surface of the light guide plate to modulate light when light from the first surface passes therethrough, and a second panel that is arranged opposite to the second surface of the light guide plate to modulate light when light from the second surface passes therethrough. In the electro-optical device, one or more optical sheets are arranged between the light guide plate and the second panel, an optical sheet of the optical sheets is laminated on the second surface of the light guide plate such that an end edge of the optical sheet is positioned between the side end surface of the light guide plate and an outer circumferential edge of an image display region of the first panel to form a space having a predetermined width between the end edge of the optical sheet and the side end surface of the light guide plate, and a light emitting element mounting substrate on which the light emitting element is mounted is configured such that a part adjacent to a region on which the light emitting element is mounted is laminated on the space of the light guide plate and a light emitting axis of the light emitting element faces the side end surface of the light guide plate.

It is preferable that the backlight device that is capable of emitting light from dual surfaces of the light guide plate be used, the first panel and the second panel be arranged at the dual surfaces of the light guide plate, and images be displayed on the first panel and the second panel by using light emitted from dual surfaces of the light guide plate. Accordingly, it is possible to display images on dual surfaces of the electro-optical device by using one backlight. Therefore, it is possible to reduce a thickness, a weight, and a manufacturing cost in an electronic apparatus such as a foldable mobile phone or a PDA, which can display images at dual surfaces. Since the part adjacent to the region of the light emitting element mounting substrate where the light emitting element is mounted is laminated on the space on the second surface of the light guide plate where optical sheets do not exist or where a small number of optical sheets are laminated as compared to other regions, a position of the light emitting element can be moved to the first surface in the thicknesswise direction of the light guide plate. As a result, it is possible to align the light emitting axis of the light emitting element with the center in the thicknesswise direction of the light guide plate. Therefore, the light quantity distribution of light emitted from the light guide plate or the like can be realized as designed.

Particularly, since light is emitted from dual surfaces of the light guide plate, it is preferable that the light quality balance of light emitted from dual surfaces of the light guide plate be properly set by aligning the light emitting axis of the light emitting element with the center in the thicknesswise direction of the light guide plate.

It is preferable that the light emitting element be a light emitting diode (LED).

Further, it is preferable that the light emitting element mounting substrate be a flexible substrate having an end portion of which is mounted on the first panel and which is bent from the first panel to the second surface of the light guide plate. According to this configuration, the light emitting element mounting substrate can function as a substrate which supplies signals or power to the first panel. Therefore, since the light emitting element mounting substrate exclusively used for mounting the light emitting element is not required, the number of parts can be reduced.

It is preferable that the electro-optical device have a substrate fixing member that is mounted on the first panel and the light guide plate such that the first panel and the light guide plate be elastically cramped in the thicknesswise direction, and the substrate fixing member elastically press and fix the light emitting element mounting substrate on the space at the second surface side. According to this configuration, the light emitting element mounting substrate can be easily fixed to the light guide plate. As a result, the light emitting element can be easily positioned.

It is preferable that the optical sheets include a second-panel-side prism sheet between the light guide plate and the second panel which transmits some of light components emitted from the second surface of the light guide plate toward the second panel and which reflects the remaining light components toward the light guide plate. The optical sheets may include a light scattering sheet between the light guide plate and the second panel which provides a scattering characteristic to light emitted from the second panel.

It is preferable that a second-panel-side light shielding sheet which opens along an outer edge of an image display region of the second panel be laminated as an optical sheet between the optical sheet and the second panel, and an end edge of the second-panel-side light shielding sheet reach the side end surface of the light guide plate. According to this configuration, light can be reliably prevented from leaking.

It is preferable that the space have a width of 1.5 mm or more from the side end surface of the light guide plate. According to this configuration, since the light emitting element mounting substrate can be fixed to the light guide plate with the sufficient area, the light emitting element mounting substrate can be reliably positioned. As a result, it is possible to improve positioning accuracy of the light emitting axis of the light emitting element.

The electro-optical devices according to the aspect of the invention are used to constitute the display devices of the electronic apparatuses containing mobile phones, mobile computers, or the like. In addition, the electro-optical devices according to the invention are suitable for electronic apparatuses such as foldable mobile phones, which are used in the open state and the folded state.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereinafter, preferred embodiments according to the invention will be described with reference to the drawings.

First Embodiment

Entire Configuration of Electro-Optical Device

Figure 1:
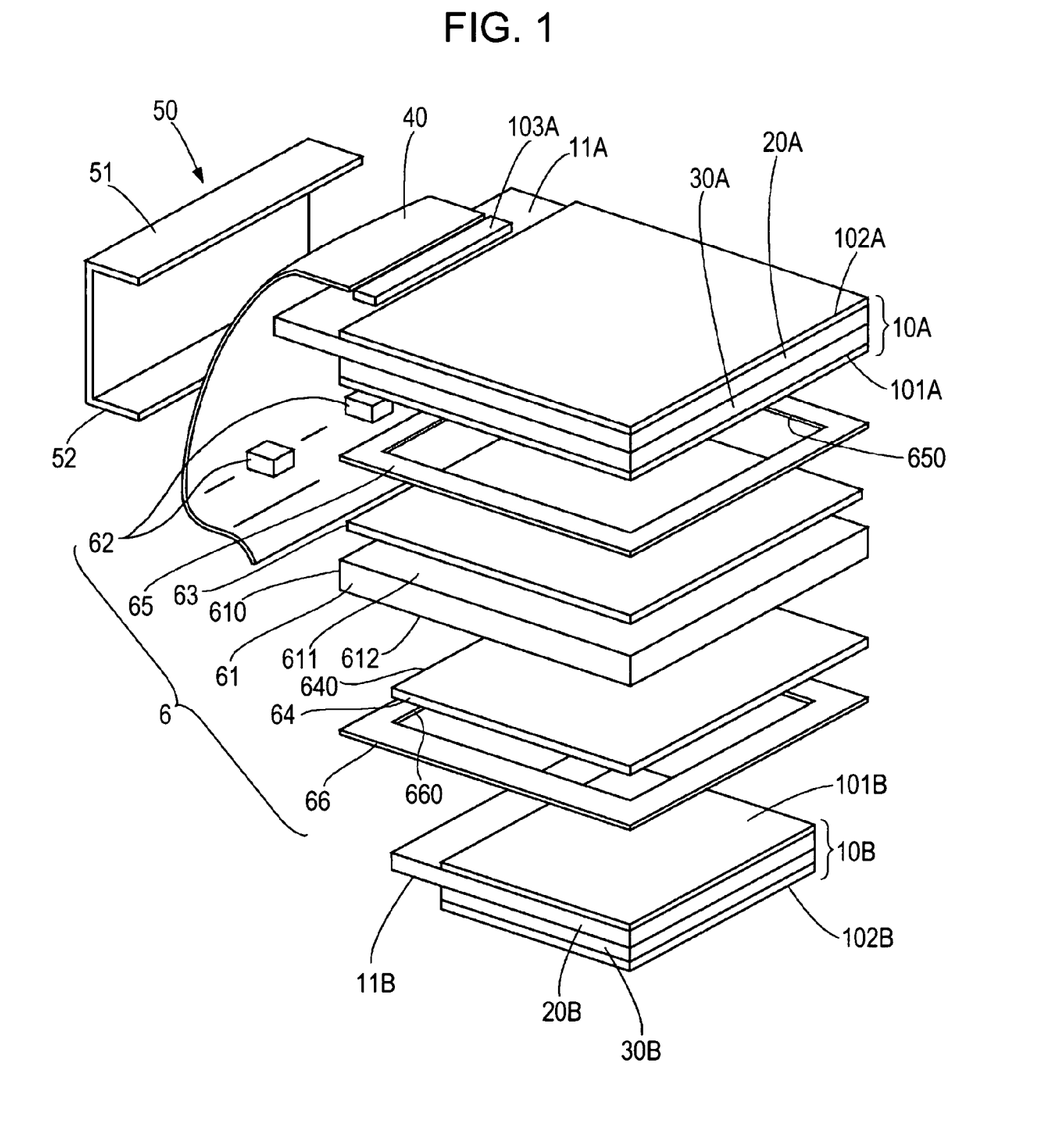
FIG. 1 is an exploded perspective view showing a configuration of an electro-optical device according to a fist embodiment of the invention.
Figure 2:
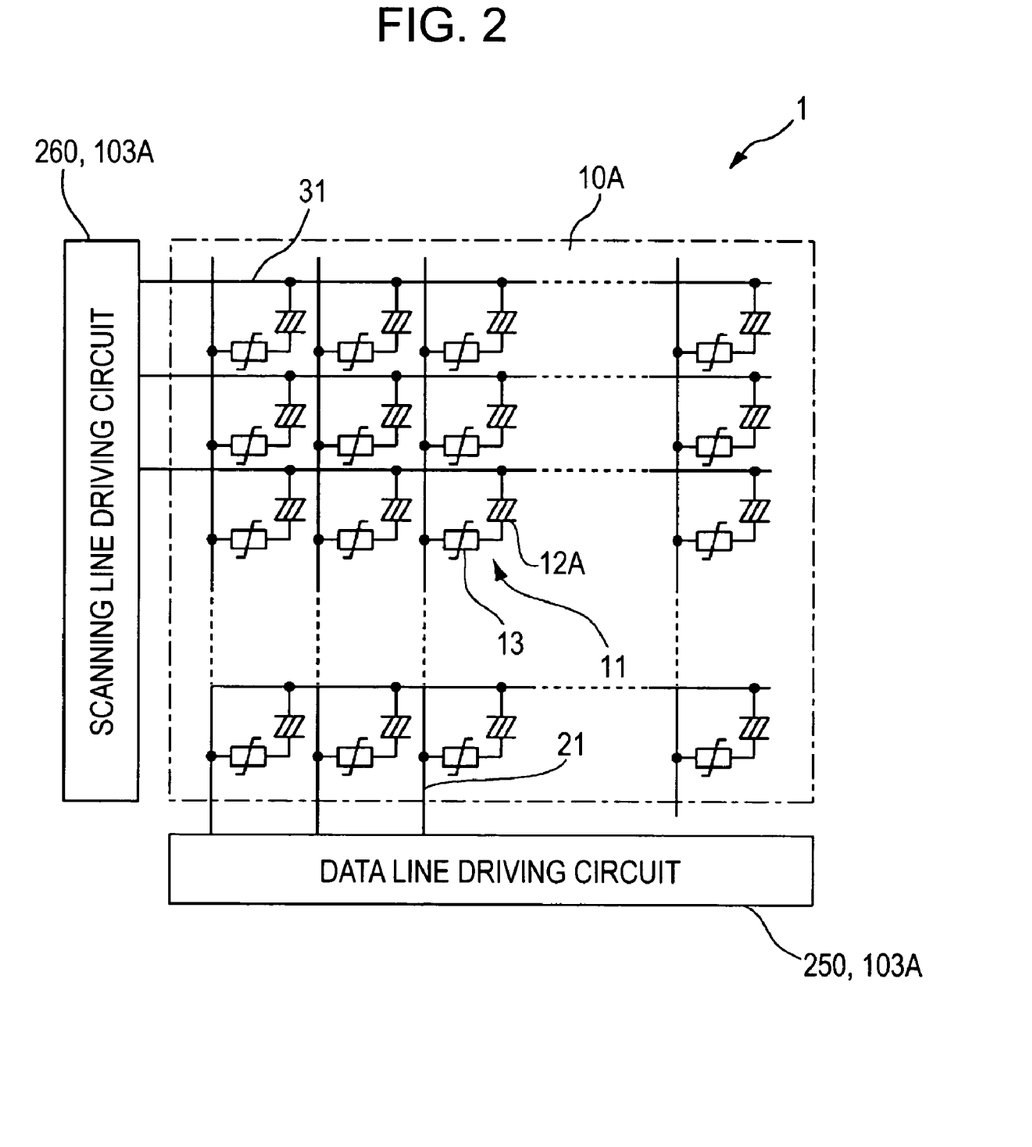
FIG. 2 is a block diagram showing an electrical configuration of an electro-optical device to which the invention is applied.
Figure 3:
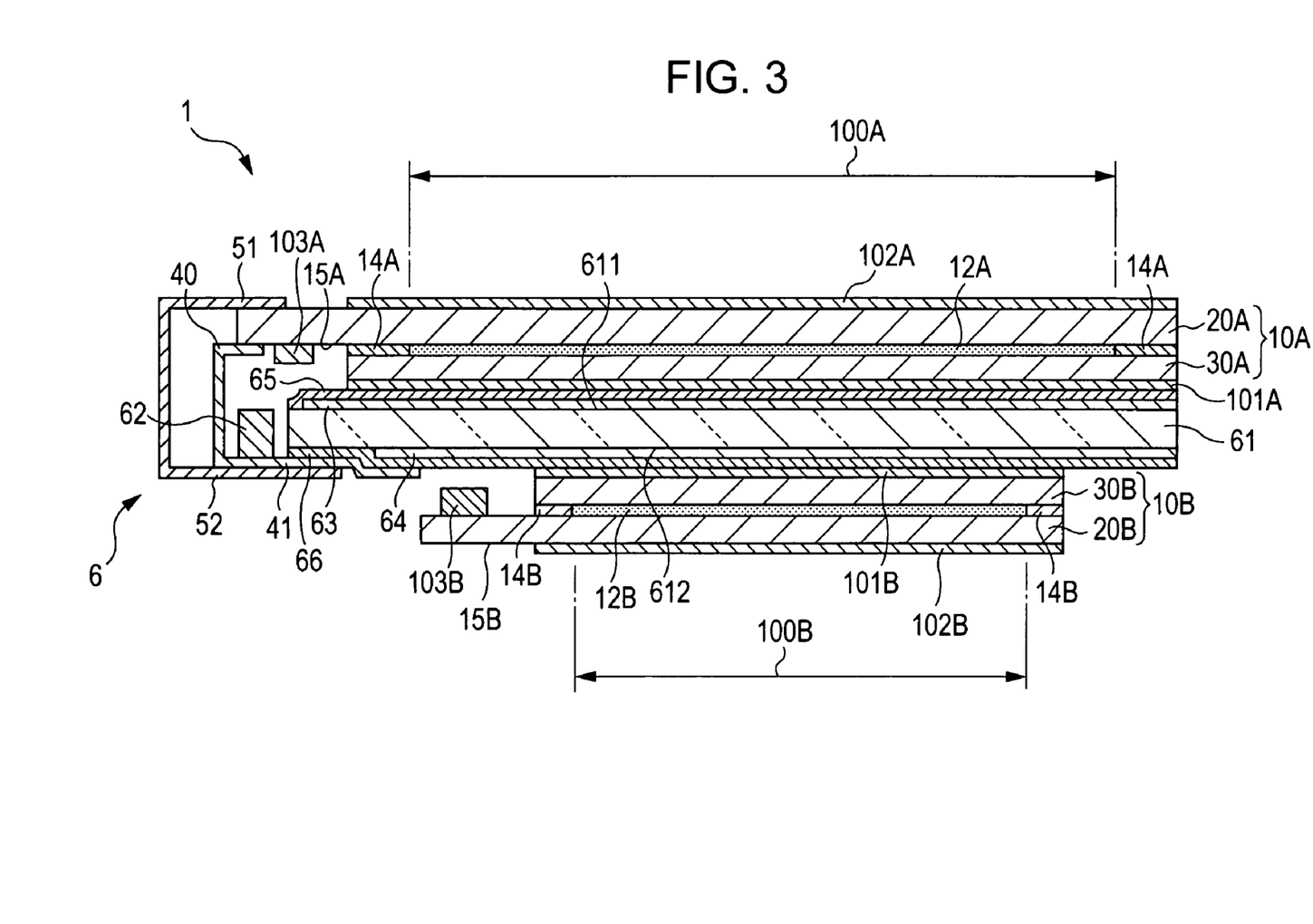
FIG. 3 is a cross-sectional view showing the configuration of the electro-optical device shown in FIG. 1.
Figure 4:
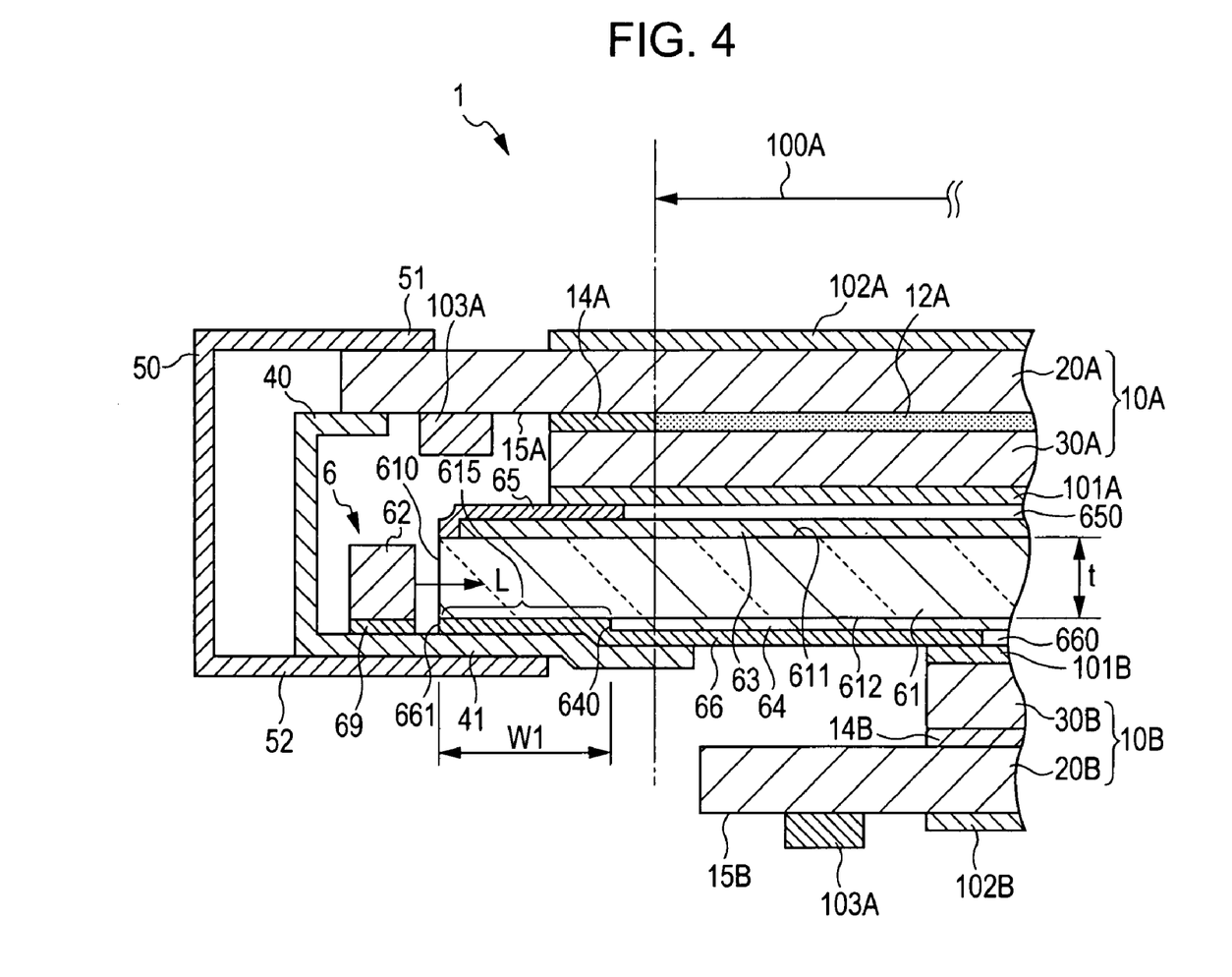
FIG. 4 is an expanded cross-sectional view showing a light-source-side end portion of the electro-optical device shown in FIG. 1.

FIG. 1 is an exploded perspective view showing a configuration of an electro-optical device according to a first embodiment of the invention. FIG. 2 is a block diagram showing an electrical configuration of an electro-optical device to which the invention is applied. FIG. 3 is a cross-sectional view showing the configuration of the electro-optical device according to the first embodiment of the invention and FIG. 4 is an expanded cross-sectional view showing a light-source-side end portion of the electro-optical device according to the first embodiment of the invention.

As shown in FIG. 1, the electro-optical device 1 of the present embodiment includes a backlight device 6 that has a plurality of LEDs 62 (light emitting elements) as light sources and a light guide plate 61 in which light from the LEDs 62 is incident on a side end surface 610 thereof and is emitted from a first surface 611 and a second surface 612, a first panel 10A that is arranged opposite to the first surface 611 of the light guide plate 61, and a second panel 10B that is arranged opposite to the second surface 611 of the light guide plate 61.

The first panel 10A and the second panel 10B are active-matrix-type transmissive or transflective color liquid crystal panels, for example. On dual surfaces of the first panel 10A, a polarizing plate 101A and a polarizing plate 102A are respectively laminated in an incident side and an emitting side. Similarly, on dual surfaces of the second panel 10B, a polarizing plate 101B and a polarizing plate 102B are respectively laminated in an incident side and an emitting side. The first panel 10A constitutes a main liquid crystal display unit and is bigger than the second panel 10B. On the other hand, the second panel 10B constitutes a sub liquid crystal display unit and is smaller than the first panel 10A.

As shown in FIG. 2, in the electro-optical device 1, the first panel 10A has a plurality of scanning lines 31 formed in rows and a plurality of data lines 21 formed in columns. Pixels 11 are respectively formed at intersections of the scanning lines 31 and the data lines 21. In each pixel 11, a liquid crystal layer 12A made of nematic liquid crystal and a thin film diode (TFD) element 13 which is a two-terminal active element are connected in series. In the present embodiment, the liquid crystal layer 12A is connected to the scanning line 31 and the TFD element 13 is connected to the data line 21. Moreover, the liquid crystal layer 12A may be connected to the data line 21 and the TFD element 13 may be connected to the scanning line 31. Each scanning line 31 is driven by a scanning line driving circuit 260 which is built in a driving IC 103A, and each data line 21 is driven by a data line driving circuit 250. Basically, the second panel 10B has the same configuration as the first panel 10A has. Therefore, the description of the second panel 10B will be omitted.

As shown in FIGS. 1, 3, and 4, in the first panel 10A, a element substrate 20A on which pixel electrodes, TFD elements 13, and so on are arranged and a counter substrate 30A on which a counter electrode, color filters, and so on are arranged are bonded with a predetermined gap via a sealant 14A, and the liquid layer 12A is held between the element substrate 20A and the counter substrate 30A. The element substrate 20A is larger than the counter substrate 30A and the driving IC 103A is mounted on an extended region 15A of the element substrate 20A from the counter substrate 30A by a COG (Chip On Glass) technique. In addition, an end portion of a flexible substrate 40 which supplies signals or power to the driving IC 103A on the first panel 10A is also mounted on the region 15A. Similarly, in the second panel 10B, an element substrate 20B on which pixel electrodes, TFD elements 13 (refer to FIG. 2), and so on are arranged and a counter substrate 30B on which a counter electrode, color filters, and so on are arranged are bonded with a predetermined gap via a sealant 14B, and the liquid layer 12B is held between the element substrate 20B and the counter substrate 30B. The element substrate 20B is larger than the counter substrate 30B and the driving IC 103B is mounted on an extended region 15B of the element substrate 20B from the counter substrate 30A by the COG (Chip On Glass) technique. In addition, an end portion of a flexible substrate (not shown) which supplies signals or power to the driving IC 103B on the first panel 10B is also mounted on the region 15B. In the present embodiment, the COG technique is used. However, the driving IC may be mounted on the liquid crystal panel by a COF (Chip On Film) technique.

Configuration of Backlight Device

In the backlight device 6, the light guide plate 61 is made of a light-transmissive mold, and a first-panel-side prism sheet 63 having, for example, a thickness of 100 μm is arranged opposite to the first surface 611. A first-panel-side light shielding sheet 65, in which an aperture 650 is formed in a region corresponding to an image display region 100A of the first panel 10A, is laminated between the first-panel-side prism sheet 63 and the first panel 10A. Similarly, a second-panel-side prism sheet 64 is arranged opposite to the second surface 612 of the light guide plate 61, and a second-panel-side light shielding sheet 66, in which an aperture 660 is formed in a region corresponding to an image display region 100B of the second panel 10B, is laminated between the second-panel-side prism sheet 64 and the second panel 10B.

The first-panel-side prism sheet 63 transmits some of light components emitted from the first surface 611 of the light guide plate 61 toward the first panel 10A and reflects the remaining light components toward the light guide plate 61. Similarly, the second-panel-side prism sheet 64 transmits some of light components emitted from the second surface 612 of the light guide plate 61 toward the second panel 10B and reflects the remaining light components toward the light guide plate 61. The light shielding sheets 65 and 66 prevent light from leaking. As the light shielding sheets, a sheet having a double layer structure of a black layer and a white layer, a sheet having a double layer structure of a silver layer and a black layer, a white sheet, or a transparent sheet may be used. The light shielding sheets have, for example, a thickness of 50 μm. The image display regions 100A and 100B are regions which display images for a user and are defined as a window or the like within a frame of an electronic apparatus. However, the regions 100A and 100B are regions which approximately overlap regions defined as apertures 650 and 660.

According to the embodiment, the LED 62 is mounted on the solder 69 having a thickness of 50 μm on the flexible substrate 40 (a light-emitting element mounting substrate) which supplies signals or power to the first panel 10A. The flexible substrate 40 is bent from the first panel 10A to the second surface 612 of the light guide plate 61. A part 41 of the flexible substrate 40 which is adjacent to the region where the LED 62 is mounted at the second surface 612 side is pressed and fixed to an end portion of the second surface 612 by a substrate fixing member 50, such that the flexible substrate 40 is positioned. The substrate fixing member 50 is a leaf spring having a U type section and is fixed on the first panel 10A and the light guide plate 61 by opposing parts 51 and 52 of the substrate fixing member 50 such that the opposing parts 51 and 52 elastically cramp the first panel 10A and the light guide plate 61 in a thicknesswise direction. In this state, the part 41 of the flexible substrate 40, which is adjacent to the region where the LED 62 is mounted, is pressed and fixed to the second surface 612 by the opposing part 52 of the substrate fixing member 50. As a result, the LED 62 is positioned such that a light emitting axis L of the LED 62 faces the side end surface 610 of the light guide plate 61.

When the flexible substrate 40 is positioned in such a manner, in the embodiment, as shown in FIG. 4 in an expanded view, the second-panel-side prism sheet 64 (a predetermined optical sheet) of a plurality of optical sheets (the second-panel-side prism sheet 64 and the second-panel-side light shielding sheet 66) laminated between the light guide plate 61 and the second panel 10B is laminated on the second surface 612 of the light guide plate 61, such that an end edge 640 of the second-panel-side prism sheet 64 is cut from the side end surface 610 of the light guide plate 61 to form a space 615 having a predetermined width. On the other hand, an end edge 661 of the second-panel-side light shielding sheet 66 reaches the side end surface 610 of the light guide plate 61, such that leakage of light is overall prevented.

As such, on the space 615, the second-panel-side light shielding sheet 66 is laminated, while the second-panel-side prism sheet 64 is not laminated. Therefore, on a region adjacent to the space 615 in the second surface 612 of the light guide plate 61, a double layer structure of the second-panel-side prism sheet 64 and the second-panel-side light shielding sheet 66 is provided. Further, on the space 615, a single layer structure of only the second-panel-side light shielding sheet 66 is provided. The part 41 of the flexible substrate 40 adjacent to the region on which the LED 62 is mounted is pressed and fixed to the space 615 having the single layer structure by the opposing part 52 of the substrate fixing member 50. Therefore, according to the embodiment, the position of the LED 62 can be moved to the first surface 611 side in the thicknesswise direction t of the light guide plate 61, as compared to the case in which the part 41 of the flexible substrate 40 adjacent to the region where the LED 62 mounted is pressed and fixed to the region where the double layer structure of the second-panel-side prism sheet 64 and the second-panel-side light shielding sheet 66 is provided. As a result, in the embodiment, the light emitting axis L of the LED 62 approximately aligns with the center in the thicknesswise direction t of the light guide plate 61.

Here, the space 615 has a width W1 of 1.5 mm or more from the side end surface 610 of the light guide plate 61. Accordingly, since the space 615 has a sufficient width, the flexible substrate 40 can be reliably positioned. As a result, location accuracy of the light emitting axis L of the LED 62 can be improved.

OPERATION AND ADVANTAGES OF THE INVENTION

In the electro-optical device 1 according to the embodiment, light emitted from the LED 61 is incident on the light guide plate 61 from the side end surface 610 and is guided through the light guide plate 61 to an opposing side end surface. At that time, on the second surface 620 of the light guide plate 61, the second-panel-side prism sheet 64 is arranged. Accordingly, some of the light components are emitted from the first surface 610 toward the first panel 10A by the second-panel-side prism sheet 64 and are optically modulated while some of the light components pass through the first panel 10A, to thereby display an image. In addition, on the first surface 610 of the light guide plate 61, the first-panel-side prism sheet 63 is arranged. Accordingly, some of the light components are emitted from the second surface 612 toward the second panel 10B by the first-panel-side prism sheet 63 and are optically modulated while some the light components pass through the second panel 10B, to thereby display the image. Therefore, according to the electro-optical device 1 of the embodiment, the image can be displayed on the two panels 10A and 10B by one backlight device 6. As a result, when an electronic apparatus having liquid crystal display units at dual surfaces is configured by using the electro-optical device 1 of the embodiment, a small number of parts are required. Therefore, the size, the weight and the manufacturing cost of the electronic apparatus can be reduced.

In the embodiment, since the second-panel-side prism sheet 64 is laminated on the second surface 612 such that the end edge 640 of the second-panel-side prism sheet 64 is cut from the side end surface 610 of the light guide plate 61, the space 615 in which the total thickness of the optical sheet is thin is obtained in the end portion of the light guide plate 61. The part 41 of the flexible substrate 40 adjacent to the region where the LED 62 is mounted is pressed and fixed to the space 615. Therefore, the position of the LED 62 can be moved to the side of the first surface 611 in the thicknesswise direction t of the light guide plate 61. As a result, the light emitting axis L of the LED 62 approximately aligns with the center in the thicknesswise direction t of the light guide plate 61. Therefore, the light quantity distribution of light emitted from the light guide plate 61 or the like can be realized as designed.

Since the embodiment has a configuration in which light is emitted from dual surfaces of the light guide plate 61 to thereby display the image, the light quality balance can be properly set by approximately aligning the light emitting axis L of the LED 62 with the center in the thicknesswise direction t of the light guide plate 61. Additionally, a high-luminance image can be displayed on dual surfaces of the first panel 10A and the second panel 10B.

The second-panel-side prism sheet 64 is laminated on the second surface 612 of the light guide plate 61 such that an end edge 640 of the second-panel-side prism sheet 64 is cut from the side end surface 610 of the light guide plate 61 to form the space 615 having a predetermined width. Moreover, the second-panel-side prism sheet 64 is laminated such that the end edge 640 is protruded toward the side end surface 610 of the light guide plate 61 from an outer circumferential edge of the image display region 100A of the first panel 10A. As viewed from the first panel 10A, luminance unevenness caused by the second-panel-side prism sheet 64 does not generate in the image displayed on the image display region 100A.

In the embodiment, since the LED 62 is mounted on the flexible substrate 40 which supplies signals or power to the first panel 10A, a substrate on which the LED 62 is mounted needs to be separately provided. Therefore, the number of parts can be reduced and the manufacturing cost of the electro-optical device 1 can be reduced.

Since the flexible substrate 40 is elastically pressed and fixed to the space 615 of the light guide plate 61 of the substrate fixing member 50, it is possible to easily and reliably fix the flexible substrate 40 to the light guide plate 61. As a result, the LED 62 can be positioned easily and reliably.

Second Embodiment

Figure 5:
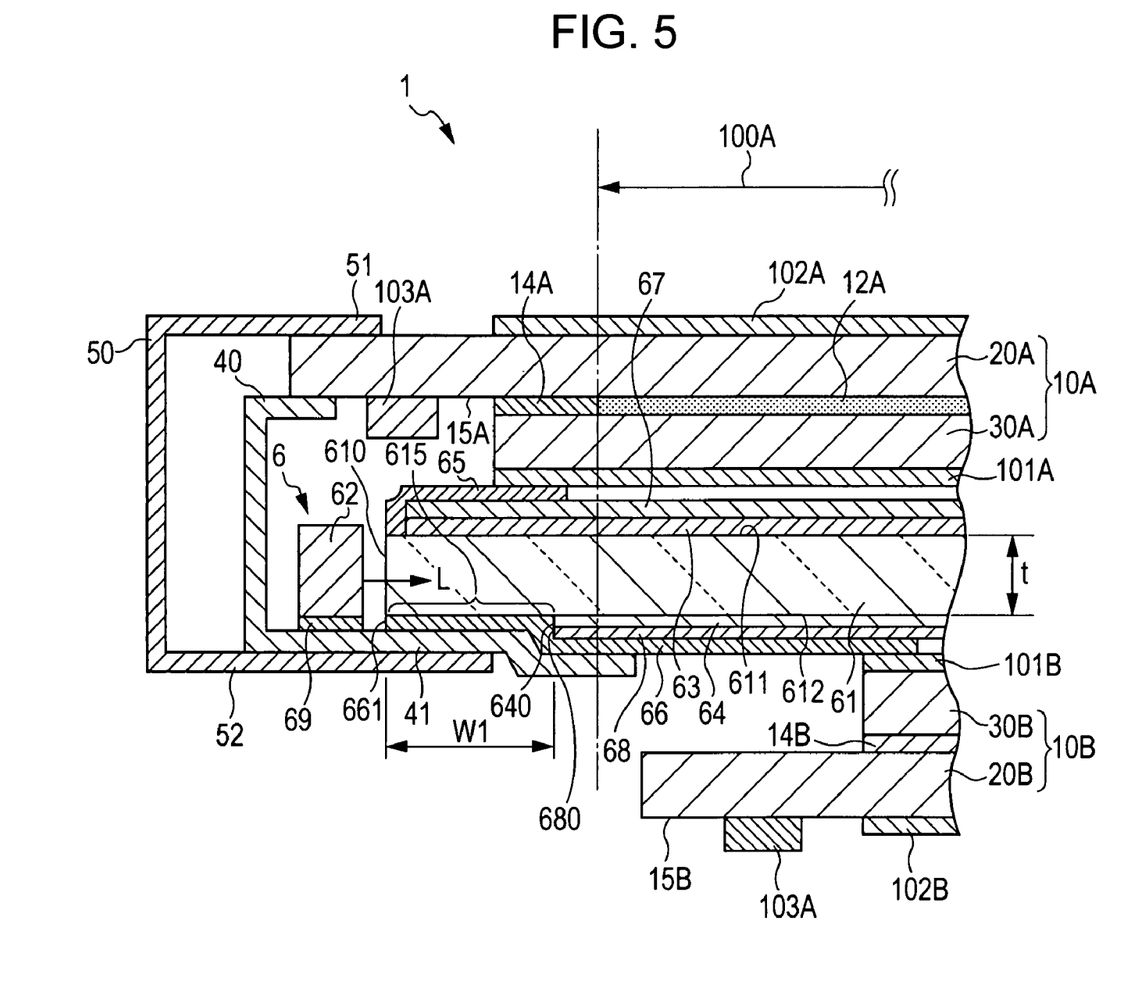
FIG. 5 is an expanded cross-sectional view showing a light-source-side end portion of an electro-optical device according to a second embodiment of the invention.

FIG. 5 is an expanded cross-sectional view showing a light-source-side end portion of an electro-optical device according to a second embodiment of the invention. Since the electro-optical device has basically the same configuration as the electro-optical device according to the first embodiment has, like reference numerals are used to denote the same elements as in the first embodiment, and the descriptions of the same elements will be omitted.

In the first embodiment, as optical sheets between the light guide plate 61 and the second panel 10B, the second-panel-side prism sheet 64 and the second-panel-side light shielding sheet 66 are laminated, and the second-panel-side prism sheet 64 is laminated such that the end edge 640 of the second-panel-side prism sheet 64 is cut from the side end surface 610 of the light guide plate 61 to form the space 615 having a predetermined width. However, in the second embodiment, as shown in FIG. 5, as optical sheets between the light guide plate 61 and the first panel 10A, the first-panel-side prism sheet 63, a first-panel-side light scattering sheet 67, and the first-panel-side light shielding sheet 66 are laminated. Further, as optical sheets between the light guide plate 61 and the second panel 10B, the second-panel-side prism sheet 64, a second-panel-side light scattering sheet 68, and the second-panel-side light shielding sheet 66 are laminated. Since the light scattering sheets 67 and 68 lend a scattering characteristic to light, a high quality image can be displayed with no glare.

In addition, on the second surface 612 of the light guide plate 61, the second-panel-side prism sheet 64 and the second-panel-side light scattering sheet 68 of a plurality of optical sheets laminated between the light guide plate 61 and the second panel 10B are laminated such that both end edges 640 and 680 are cut from the side end surface 610 of the light guide plate 61 to form the space 615 having a predetermined width between both end edges 640 and 680 and the side end surface 610 of the light guide plate 61. Therefore, on a region adjacent to the space 615 in the second surface 612 of the light guide plate 61, a triple layer structure of the second-panel-side prism sheet 64, the second-panel-side light scattering sheet 68, and the second-panel-side light shielding sheet 66 is provided. Further, on the space 615, a single layer structure of only the second-panel-side light shielding sheet 66 is provided. In the embodiment, the part 41 the flexible substrate 40 adjacent to the region where the LED 62 is mounted is pressed and fixed to the space 615 having the single layer structure by the opposing part 52 of the substrate fixing member 50. Therefore, according to the embodiment, the position of the LED 62 can be moved to the side of the first surface 611 in the thicknesswise direction t of the light guide plate 61. As a result, it is possible to approximately align the light emitting axis L of the LED 62 with the center in the thicknesswise direction t of the light guide plate 61. Therefore, the embodiment has the same advantages as the first embodiment has.

Third Embodiment

Figure 6:
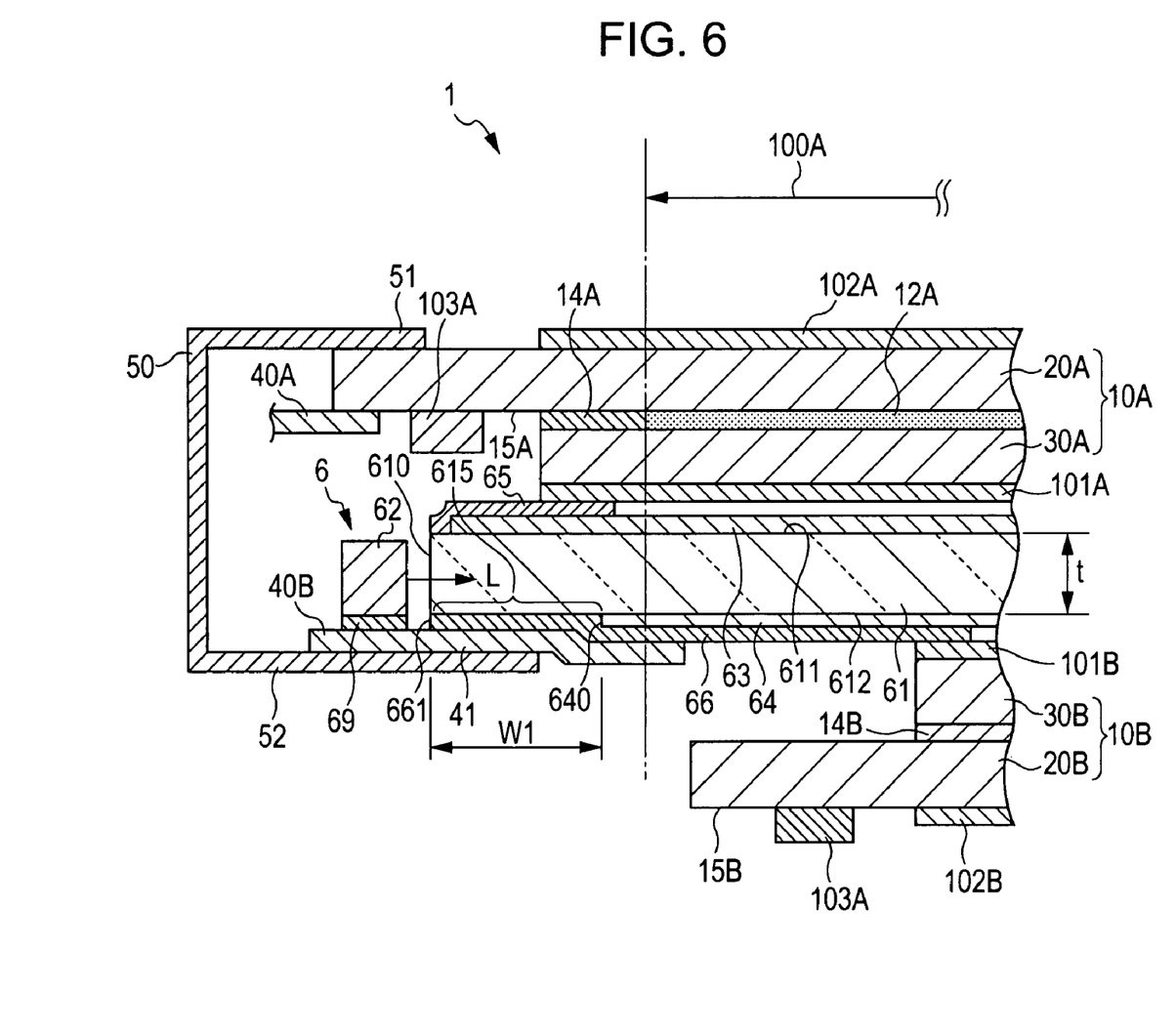
FIG. 6 is an expanded cross-sectional view showing a light-source-side end portion of an electro-optical device according to a third embodiment of the invention.

FIG. 6 is an exploded cross-sectional view showing a light-source-side end portion of an electro-optical device according to a third second embodiment of the invention. Since the electro-optical device according to the embodiment has basically the same configuration as the electro-optical device according to the first embodiment has, like reference numerals are used to denote the same elements as in the first embodiment, and the descriptions of the same elements will be omitted.

In the first embodiment, the LED 62 is mounted on the flexible substrate 40 which supplies signals or power to the first panel 10A. However, in the embodiment, as shown in FIG. 6, LED 62 is mounted on a rigid substrate 40B other than a flexible substrate 40A which supplies signals or power to the first panel 10A by the solder 69.

In addition, as in the first embodiment, in the embodiment, the second-panel-side prism sheet 64 (a predetermined optical sheet) is laminated such that the end edge 640 of the second-panel-side prism sheet 64 is cut from the side end surface 610 of the light guide plate 61 to form the space 615 having a predetermined width between the end edge 640 and the side end surface 610 of the light guide plate 61. In addition, the substrate fixing member 50 presses and fixes the part 41 of the rigid substrate 40B adjacent to the region where the LED 62 is mounted to the space 615 of the second surface 612. Therefore, according to the embodiment, the position of the LED 62 can be moved to the side of the first surface 611 in the thicknesswise direction t of the light guide plate 61. As a result, it is possible to approximately align the light emitting axis L of the LED 62 with the center in the thicknesswise direction t of the light guide plate 61.

Others

In the above-mentioned embodiments, electro-optical devices having liquid crystal panels using TFD elements as active elements have been described. However, the invention can be applied to electro-optical devices having liquid crystal panels using TFTs as active elements.

Entire Configuration of Electronic Apparatus and Electro-Optical Device

Figure 7A:
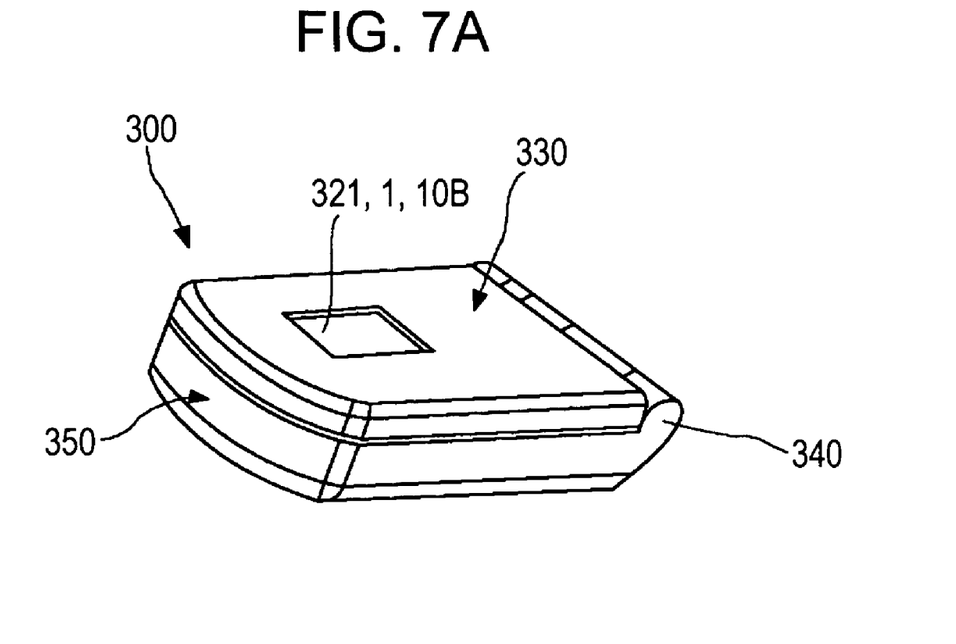
FIG. 7A is a diagram illustrating a state in which a mobile phone as an example of an electronic apparatus to which the invention is applied is folded.
Figure 7B:
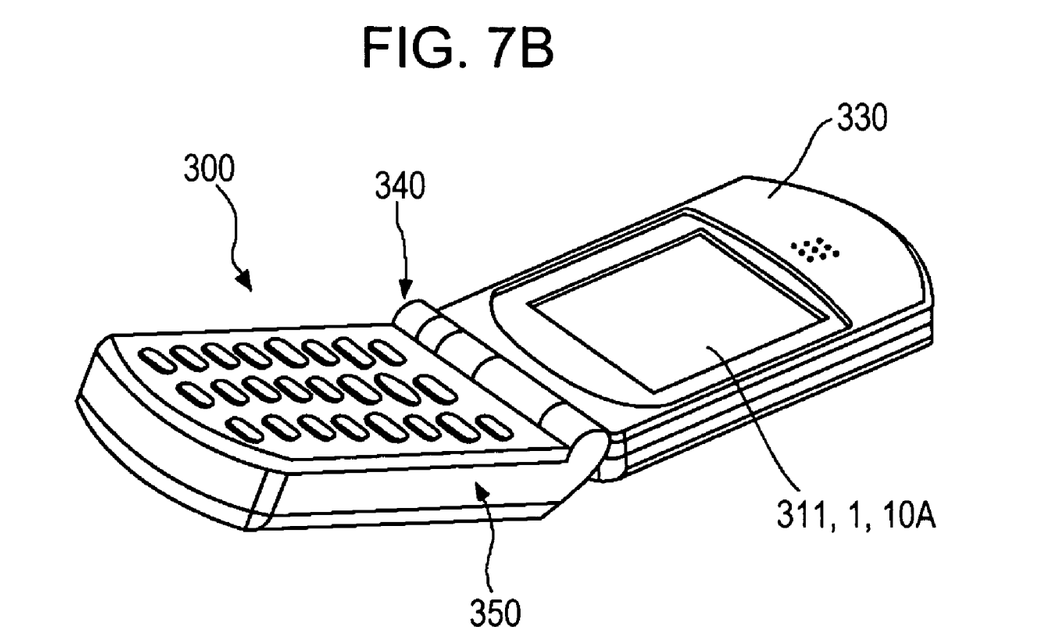
FIG. 7B is a diagram illustrating a state in which the mobile phone as the example of the electronic apparatus to which the invention is applied is opened.

FIG. 7A is a diagram illustrating a state in which a foldable mobile phone 300 as an example of an electro-optical device to which the invention is applied is folded and FIG. 7B is a diagram illustrating a state in which the foldable mobile phone 300 as the example of the electro-optical device to which the invention is applied is opened.

An electro-optical device to which the invention is applied is used for, for example, the foldable mobile phone 300 shown in FIGS. 7A and 7B. In the mobile phone 300, a cover body 330 is coupled with an operation body 350 by a hinge part 340 such that it can be freely rotate with regard to the operation body. The mobile phone 300 has a main display unit 311 which displays an image on the inside of the cover body 330 when the cover body 330 is opened and a sub display unit 321 which displays an image when the cover body 330 and the operation body 350 are folded. Therefore, when, in the electro-optical device 1 of the invention, the main display unit 311 is configured at the first panel 10A and the sub display unit 321 is configured at the second panel 10B, the thickness, the weight and the manufacturing cost of the mobile phone can be reduced.

What is claimed is:

1. An electro-optical device comprising:
a backlight device including:
    a light emitting element having a light emitting surface with a light emitting axis;
    a light guide plate having:
        a side end surface on which light emitted from the light emitting element is incident;
        a first surface from which light is emitted;
        a second surface from which light is emitted;
a first panel arranged opposite to the first surface of the light guide plate, the first panel modulating light when light from the first surface passes therethrough, the first panel including an outer circumferential edge of an image display region;
a second panel arranged opposite to the second surface of the light guide plate, the second panel modulating light when light from the second surface passes therethrough;
one or more optical sheets arranged between the light guide plate and the second panel;
a light emitting element mounting substrate including:
    a light emitting element mounting region on which the light emitting element is mounted; and
    a part adjacent to the light emitting element mounting region,
wherein one of the optical sheets is stacked on the second surface of the light guide plate such that an end edge of the optical sheet is positioned between the side end surface of the light guide plate and the outer circumferential edge to form a space having a predetermined width between the end edge of the optical sheet and the side end surface of the light guide plate, and
the part of the light emitting element mounting substrate is located at the space and the light emitting surface of the light emitting element faces the side end surface of the light guide plate.

2. The electro-optical device according to claim 1, wherein the light emitting axis of the light emitting element is approximately aligned with a center in a thicknesswise direction of the light guide plate.

3. The electro-optical device according to claim 1, wherein the light emitting device is a light emitting diode (LED).

4. The electro-optical device according to claim 1, wherein the light emitting element mounting substrate is a flexible substrate having an end portion of which is mounted on the first panel and which is bent from the first panel to the second surface of the light guide plate.

5. The electro-optical device according to claim 1, further comprising:
a substrate fixing member that is disposed to the outer surfaces of the first panel and the light guide plate to elastically clump the first panel and the light guide plate in a stacking direction, the substrate fixing member elastically pressing and fixing the light emitting element mounting substrate at the space from the second surface side of the light guide plate.

6. The electro-optical device according to claim 1, wherein the optical sheet includes a second-panel-side prism sheet between the light guide plate and the second panel which transmits a portion of light components emitted from the second surface of the light guide plate toward the second panel and which reflects the remaining light components toward the light guide plate.

7. The electro-optical device according to claim 1,
wherein the optical sheet includes a light scattering sheet between the light guide plate and the second panel which provides a scattering characteristic to light emitted to the second panel.

8. The electro-optical device according to claim 1,
wherein a second-panel-side light shielding sheet which opens according to an outer edge of an image display region of the second panel is laminated as an optical sheet between the optical sheet and the second panel, and
an end edge of the second-panel-side light shielding sheet reaches the side end surface of the light guide plate.

9. The electro-optical device according to claim 1,
wherein the space has a width of 1.5 mm or more from the side end surface of the light guide plate.

10. An electronic apparatus including an electro-optical device according to any one of claims 1 to 9.

* * * * *